Aug. 29, 1939.   C. C. CURTIS   2,171,026
OIL TESTING APPARATUS
Filed March 16, 1937   2 Sheets-Sheet 1
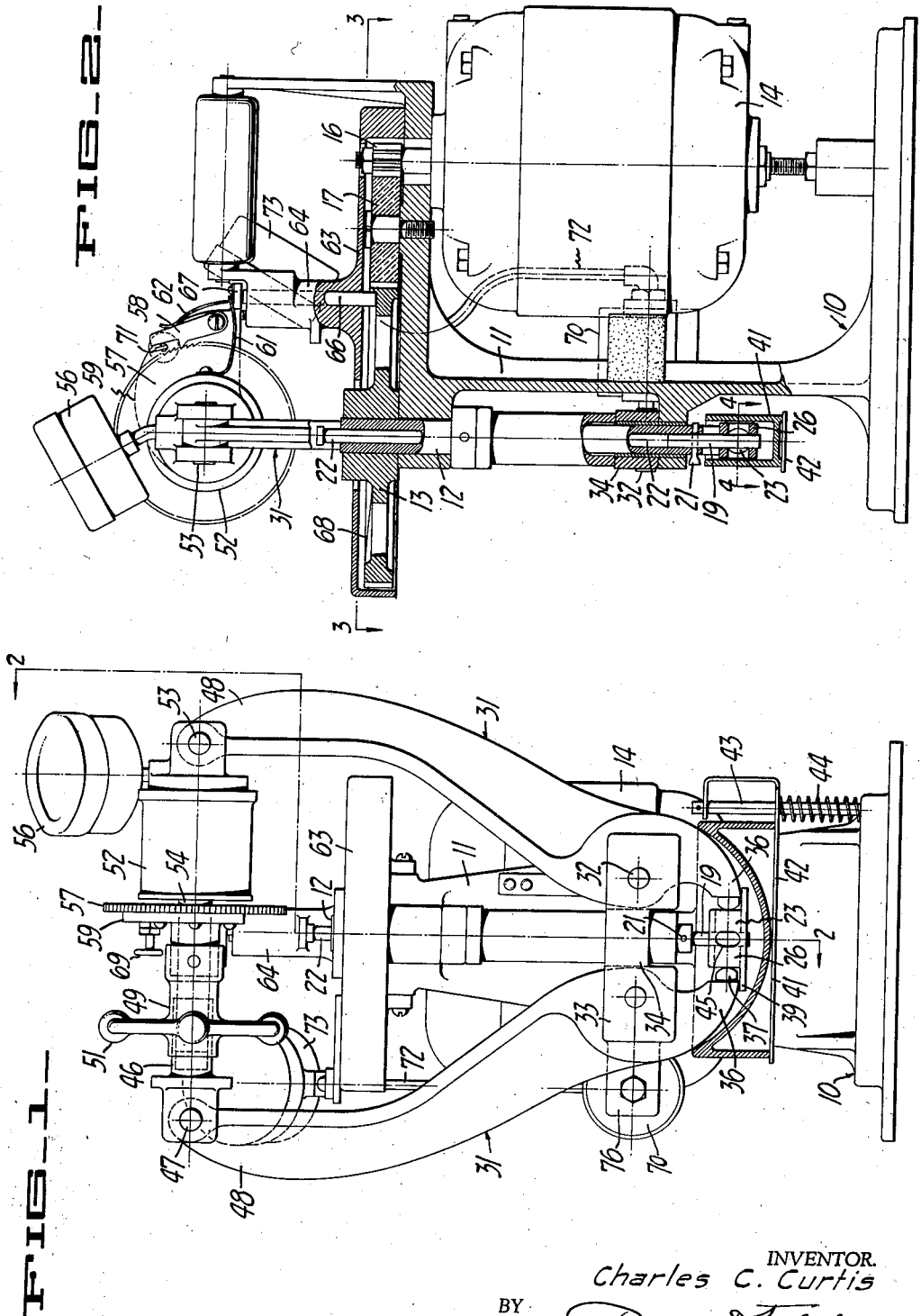
INVENTOR.
Charles C. Curtis
BY
ATTORNEY.

Aug. 29, 1939.　　　　C. C. CURTIS　　　　2,171,026
OIL TESTING APPARATUS
Filed March 16, 1937　　　2 Sheets-Sheet 2
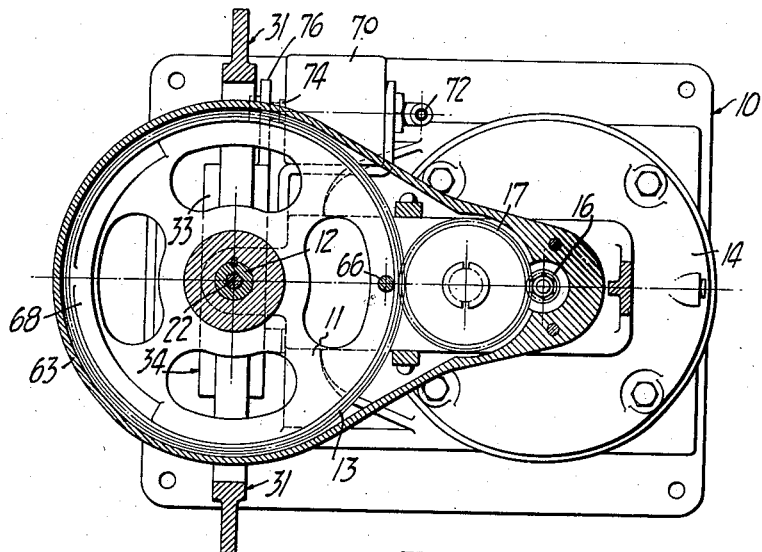
FIG_3_
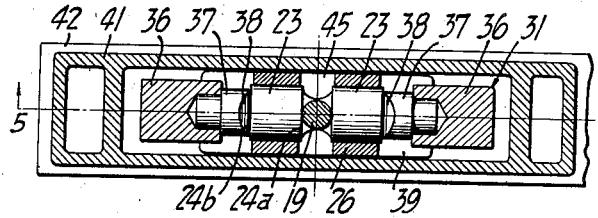
FIG_4_
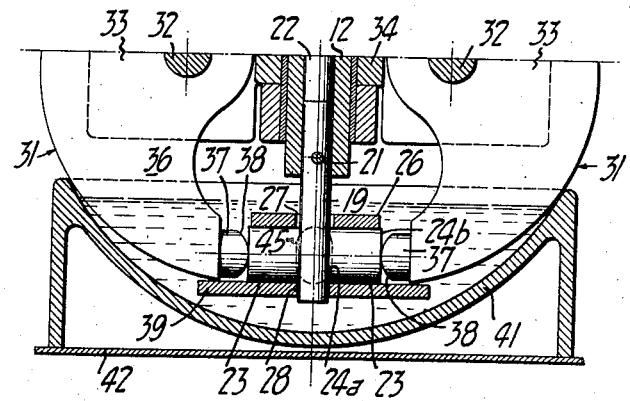
FIG_5_
INVENTOR.
Charles C. Curtis
BY
ATTORNEY.

Patented Aug. 29, 1939

2,171,026

UNITED STATES PATENT OFFICE 2,171,026

OIL TESTING APPARATUS

Charles C. Curtis, Oakland, Calif., assignor to Halstead Products Company, Oakland, Calif., a corporation of California Application March 16, 1937, Serial No. 131,201

12 Claims. (Cl. 265—10)

This invention relates generally to apparatus or machines for determining certain characteristics of lubricating oil. I have particular reference to machines to determine the point at which "gripping" occurs, and which afford an index of the ability of a particular oil to withstand bearing loads.

It is an object of the invention to provide a machine of the above character which will utilize inexpensive testing parts of relatively simple construction, whereby tests of the type desired can be carried out at minimum cost.

A further object of the invention is to provide a machine of the above character which requires no special skill to carry out a test, and which will afford semi-automatic operation.

Further objects of the invention will appear from the following description in which the preferred embodiment of the invention has been set forth in detail in conjunction with the accompanying drawings.

Referring to the drawings:

Fig. 1 is a front elevational view, illustrating a machine incorporating the present invention.

Fig. 2 is a cross-sectional view taken along the line 2—2 of Fig. 1.

Fig. 3 is a cross-sectional view taken along the line 3—3 of Fig. 2.

Fig. 4 is a cross-sectional detail on an enlarged scale, taken along the line 4—4 of Fig. 2.

Fig. 5 is a cross-sectional detail, taken along the line 5—5 of Fig. 4.

Oil testing machines of the type to which this invention relates make use of a driven test pin or shaft, upon which accurately machined bearing blocks are pressed. The surfaces in contact are lubricated with a sample of oil to be tested, and the test pin is rotated at a predetermined rate, while the pressure between the bearing surfaces is increased, until "gripping" occurs. Therefore with a given speed of rotation of the test pin, the pressure which must be applied to the bearing blocks to cause gripping, affords an index of the load required to break down the lubricant film formed by the oil. The bearing blocks used in the past have been of expensive construction, since they have been notched or made concave to fit upon opposite sides of the test pin. Also expensive parts difficult to set up by an ordinary mechanic, have been employed to retain and apply the blocks upon the test pin.

My machine likewise makes use of bearing blocks or bearing members, which are pressed upon opposite sides of a cylindrically surfaced bearing pin or shaft. However, these members are of simple construction with planor faces, and they are retained in a novel manner to insure their proper alignment and contact with the test pin. Novel means are also provided for applying force to the outer ends of the bearing blocks, together with means whereby the force applied can be measured.

Referring to the drawings, the machine illustrated makes use of a base support 10, which carries an upwardly extending bracket 11. Journalled to the bracket 11, there is a vertical rotatable spindle 12, which is preferably hollow, and which has its upper end secured to a drive gear 13. Also carried by the base structure 10 there is a suitable electrical motor 14, such as one of the induction type which operates at a substantially constant speed. The shaft of motor 14 carries a pinion 16, and this pinion drives the gear 13, through the idler gear 17. Pinion 16 and idler gear 17 are removable, and likewise gear 13 can be removed, to enable replacement by gears which will afford a different drive ratio.

Loosely extending into the lower end of the spindle 12, there is a steel test pin 19, which ordinarily has a drive connection with the spindle through the shear pin 21. Test pin 19 is machined to have a smooth cylindrical surface with which bearing members or blocks cooperate, and is suitably hardened. Slidably positioned within the spindle 12 there is a mandrel 22, by means of which the pin 19 can be ejected from the lower end of the spindle, after the pin 21 has been sheared by excessive torque.

Figs. 4 and 5 illustrate more clearly the so-called bearing members or blocks 23, which cooperate with the test pin 19. These members 23 are cylindrical in shape, and are provided with flat parallel end faces 24a and 24b. These end faces are machined to a high degree of accuracy, as by means of a suitable grinding operation, and are of hardened steel. As is shown more clearly in Fig. 4 the members 23 are engaged by a so-called retention cage 26. This retention cage is bored laterally to afford a snug sliding fit for the members 23, whereby these members are maintained in alignment. The upper side of the cage is provided with an opening 27, to accommodate pin 19, and which is of considerably larger diameter than the diameter of the pin. The lower side of the retention cage is provided with an opening 28, which more snugly accommodates the pin 19, and which aids in retaining the desired alignment.

For the purpose of applying force to the outer ends of the bearing members 23, means are provided making use of the force multiplying levers 31. These levers have fulcrum connections 32, with the bifurcated ends 33, of the member 34. This member in turn is journalled so that it may oscillate a slight amount concentric with the axis of the spindle 12. The lower portions or jaws 36, formed on the levers 31, are provided with hardened tips 37, which engage the outer end 24b of member 23. Note particularly that tips 37 are machined convex in accordance with the surface of a cylinder, the axis of the cylinder being at right angles to the axis of the spindle 12. In other words as seen in Fig. 4, surfaces 38 are cylindrical shaped, so as to have substantially line contact with the ends 24b of members 23, the lines of contact being coincident with the line of centers of members 23, and at right angles to the axis of pin 19 (Fig. 5). The cage 26 (Fig. 5) is shown provided with lower lateral extension tabs 39, which underly the lower ends of jaws 36, and which are useful in generally locating the retention cage during setting up of the machine for a test.

It may be pointed out at this time that when the machine is in operation pin 19 operates at a predetermined speed, and a sample of oil to be tested is arranged to lubricate the surfaces in contact between the pin 19 and the members 23. It will be evident that these surfaces comprise portions of the cylindrical periphery of pin 19 and the parallel end faces 24a, which portions are virtually lines which extend parallel to the axis of pin 19, and in a common plane with the axis of the pin. As a convenient means for retaining this sample of oil, I have shown a small receptacle 41, the interior of which is dimensioned to receive the cage 26 and the lower end portions of the jaws 36, substantially as shown in Figs. 4 and 5. A support for this receptacle can consist of an underlying arm 42, which is slidably carried by the fixed pin 43. Compression spring 44 presses arm 42 and the receptacle upwardly in its operating position, and with this arrangement the receptacle can be readily removed by depressing arm 42. The sides of the cage 26 are shown provided with openings 45, so that the sample of oil can have free access to the bearing surfaces.

The means employed for applying varying forces to the levers 31, can be constructed as follows: A threaded member 46 has a pivotal connection 47, with the extended arm 48 of one of the levers 31. An internally threaded sleeve 49 engages member 46, and is shown provided with a hand wheel 51 or some other means whereby the sleeve 49 can be turned manually. Interposed between the sleeve 49 and the other extended arm 48, there is a hydraulic piston and cylinder assembly 52. The cylinder part of this assembly also has a pivotal connection 53 with the associated arm 48. The piston rod 54 of assembly 52, is in alignment with and is fixed to the sleeve 49. Assembly 52 connects with a pressure gauge 56, whereby readings of this gauge indicate the amount of force with which the upper arms 48 of levers 31, are being forced apart.

Manual application of varying forces can be had by turning hand lever 51, whereby the extended arms 48 can be forced apart. Automatic operation can be had by the use of ratcheting mechanism, making use of a ratchet wheel 57 and pawl 58. Wheel 57 is shown mounted upon the rod 54, while pawl 58 is shown mounted upon a rocker arm 59, which in turn is journalled to rotate about the axis of wheel 57. Spring 61 serves to bias the rocker arm 59 in a direction to rotate the same clockwise, as shown in Fig. 2, and a spring 62 urges pawl 58 into engagement with the teeth of ratchet wheel 57.

Extending upwardly from a fixed part of the machine, as for example the cover 63 for the gears, there is a stud 64. Slidably fitted within this stud 64, there is a pin 66, the upper end of which underlies the end portion 67 of rocker arm 59. The lower end of pin 66 engages a cam track 68, which is formed upon the upper face of gear 13. In order to temporarily disable pawl 58, a rotatable pin 69 is shown mounted in the rocker arm 59. An end portion 71 of this pin underlies a portion of the pawl 58, whereby upon turning the pin 69, pawl 58 can be disengaged with respect to the ratchet teeth, and retained in such disengaged position.

It will be evident that when the pawl 58 is in operative relationship with the ratchet wheel 57, and the machine is in operation, periodic raising and lowering of pin 66, by the cam track 68, will cause predetermined amounts of angular movement to be imparted to the ratchet wheel 57, and thus to the threaded sleeve 49. Thus the jacking force applied which tends to spread the extended arms 48, and to increase the force applied upon the bearing members 23, can be gradually increased until gripping or failure of the oil film occurs.

In connection with the machine described above it is desirable to have means for indicating the torque imposed upon the pin 19, to continue its rotation. To afford simplified means of this character I make use of a hydraulic pressure cell 70 of the Sylphon tube type, which is mounted upon the base of the machine, and which is connected by a pipe 72 to the pressure gauge 73. An operating plunger 74 projects from the cell 70, and is adapted to be engaged by a tab 76, this tab in turn being secured to the member 34. Since member 34 to which the levers 31 are connected, is free to rotate a limited amount about the axis of spindle 12, and since tab 76 is adapted to engage the plunger 74, it will be evident that the torque imposed upon pin 19, and variations in torque, will be indicated by the readings of the pressure gauge 73.

Operation of the machine as a whole, can be reviewed as follows: To set up the machine for a test, a test pin 19 is secured to the lower end of spindle 12, by means of a shear pin 21, and the cage 26 together with a pair of members 23, are assembled upon the pin, substantially as shown in Figs. 4 and 5. At this time hand wheel 51 has been turned to such a position that the jaws 36 are substantially retracted. The operator now turns the hand wheel 51, while holding the cage 26 in place, until the lower ends of jaws 36 grip the outer faces 24b of members 23, with sufficient force to retain these members and the cage 26, in place. A sample of oil to be tested is then placed in the receptacle 41, and this receptacle applied to the machine, whereby the cage 26 and members 23, are completely immersed. The operator now starts the motor 14 in operation, and with the pawl 58 released, operation is continued for a period of time sufficient to properly break in the bearing surfaces. Pin 69 is then turned to permit pawl 58 to engage the ratchet wheel 57, whereby for each revolution of the spindle 12 the ratchet wheel is turned a predetermined increment, thereby gradually incrasing the force upon the members 23. In order to have a comprehensive record of the test the operator from time to time can take the reading of gauge 56, as an indication of the pressure or force with which members 23 are being pressed upon the pin 19, and also readings of the gauge 73 as an indication of the friction or torque. After the pressure shown by gauge 56 has been built up to a predetermined value, dependent upon the ability of the oil film to withstand loads, gripping or seizure occurs between the members 23 and pin 19, to break the shear pin 21. Thereafter it is a simple matter to remove the remaining portion of pin 19, by means of the mandrel 22, and to prepare the machine for a new test.

One desirable characteristic of the machine described above is that it enables use of relatively simple members 23, which can be manufactured at low cost, and therefore a great number of tests can be made at a minimum of expense. The free floating cage 26 insures proper alignment of the members 23. Likewise proper alignment and engagement of members 23 on pins 19 along diametrically opposite linear areas, is insured by the convex shaping and disposition of members 37. Aside from other general features of simplicity, the machine is relatively compact and light in weight, and if desired can be employed as a portable unit for a wide variety of testing operations.

The shear pin 21 is of such size and strength that it will immediately shear when gripping occurs. Thus the parts are not otherwise broken or seriously mutilated, thereby facilitating inspection and interpretation of the initial score marks.

It will be evident that my machine can be used for a wide variety of tests. For example it can be employed to determine rates of wear between bearing surfaces, both for different bearing materials and for different lubricating oils. In such tests the pawl 58 is disabled and wheel 51 manually operated to adjust the bearing pressures.

I claim:

1. In an oil testing apparatus of the character described, a test pin having a smooth cylindrical surface, a pair of bearing members, each of said bearing members having two parallel and planar faces, formed on opposite ends of the same, means for retaining said bearing members on diametrically opposite sides of the pin with said bearing members in alignment and with the faces of the two bearing members in parallelism, whereby adjacent parallel bearing faces of the two bearing members contact the cylindrical surface of the pin along parallel and diametrically opposite lines, and means for applying force to said bearing members tending to urge the same against said pin, said last means engaging the remote faces of said bearing members along lines lying in a plane coincident with the line of center of said bearing members and disposed at right angles to the axis of the pin.

2. In an oil testing apparatus of the character described, a test pin having a smooth cylindrical surface, a pair of bearing members each having a planar bearing face, a cage in which said bearing members are slidably disposed, for movement in opposite directions with respect to each other, said cage serving to retain said bearing members on opposite sides of said pin, and means serving to engage the outer ends of said bearing members, without engaging said cage, for urging said bearing members against the pin.

3. In an oil testing apparatus of the character described, a test pin having a smooth cylindrical surface, means for rotating the test pin, a pair of bearing members each having two parallel planar end faces, a retention cage in which said bearing members are movably fitted, said retention cage serving to retain said bearing members on diametrically opposite sides of said pin, with the end faces of said bearing members parellel to each other, and means engaging the outer planar end faces of said bearing members for urging said bearing members towards each other upon opposite sides of said pin, said retention cage being substantially free floating and removable with respect to said pin.

4. In an oil testing apparatus of the character described, a test pin having a cylindrical surface, means for rotating the test pin about its axis, a pair of bearing members each having two parallel and planar end faces, a retention cage in which said bearing members are removably fitted, said retention cage serving to retain said bearing members upon opposite sides of said test pin, with the end faces of both bearing members substantially parallel, and means including a pair of jaw members engaging the outer end faces of said bearing members and serving to urge said bearing members upon said test pin, said last means including tips which contact the outer end faces of said bearing members along parallel lines disposed at right angles to the axis of the test pin.

5. In an oil testing apparatus of the character described, a base structure, a rotatable spindle journalled to the base structure, a gear secured to the spindle, motive means having a drive connection to said gear, a test pin carried by one end of said spindle, test blocks adapted to be forced upon opposite sides of said pin, a pair of jaw-like levers adapted to apply force to said test blocks, jacking means for applying force to said jaw-like levers, ratcheting means serving to operate said jacking means, and cam means formed upon said gear, serving to actuate said ratcheting means.

6. In an oil testing apparatus of the character described, a base structure, a spindle journalled to the base structure, means for driving the spindle, a test pin carried by one end of the spindle, bearing blocks adapted to be pressed upon opposite sides of said test pin, means for urging said bearing blocks upon said pin, said last means including a pair of lever, jacking means for applying force to said levers, and a hydraulic piston and cylinder interposed in said jacking means, and means for indicating the hydraulic pressure developed in said cylinder.

7. In an oil testing apparatus of the character described, a test pin having a cylindrical surface, a pair of bearing members each having a planar bearing face, means for retaining the faces of said bearing members parallel on diametrically opposite sides of the pin, said last means slidably retaining said bearing members and being apertured to accommodate the test pin, means detached from the retaining means for urging said bearing members against opposite sides of the pin, and motive means for turning said pin.

8. In an oil testing apparatus of the character described, a test pin having a cylindrical surface, a pair of bearing members each having a planar bearing face, a cage serving to retain said bearing members on diametrically opposite sides of the pin with said faces parallel, said cage being provided with two spaced walls apertured to accommodate the test pin, means detached from the cage for urging said bearing members against opposite sides of the pin, means for rotating said pin about its axis, and means for retaining said pin and said bearing members immersed in a sample of oil.

9. In an oil testing apparatus of the character described, a test pin having a cylindrical surface, means for rotating the test pin about its axis, a pair of bearing blocks each having two planar bearing faces formed on the end faces of the same, means for pressing the opposed end faces of said bearing blocks on diametrically opposite sides of the pin, means detached from said pressing means for retaining said bearing blocks with said opposed faces substantially parallel, and means for immersing said pin and said bearing blocks in a sample of oil to be tested.

10. In an oil testing apparatus of the character described, a test pin having a cylindrical surface, means for rotating the test pin about its axis, a pair of bearing blocks each having two parallel and planar bearing faces on opposite end faces of the same, means for urging said bearing blocks upon diametrically opposite sides of the pin, means independent of said urging means for retaining said bearing blocks in alignment with the bearing faces of the opposed end faces parallel to each other, and means for immersing said pin and said bearing blocks in a sample of oil to be tested.

11. In an oil testing apparatus of the character described, a test pin having a smooth cylindrical surface, means for rotating the test pin, a pair of bearing members each having end faces adapted to bear upon the test pin, a retention cage in which said bearing members are movably fitted, said retention cage serving to retain said bearing members on diametrically opposite sides of said pin, with the end faces of said bearing members bearing upon the pin, and means engaging the outer end faces of said bearing members for urging said bearing members towards each other upon opposite sides of said pin, said retention cage being substantially free floating and removable with respect to said pin.

12. In an oil testing apparatus of the character described, a test pin having a cylindrical surface, a pair of bearing members each having a planar bearing face, means for retaining the planar faces of said bearing members parallel on diametrically opposite sides of said pin, said last means slidably retaining said bearing members and being apertured to accommodate the test pin, and means for urging said bearing members against opposite sides of the pin.

CHARLES C. CURTIS.